Oct. 20, 1953     P. BROOKS     2,655,724
CROWN TOOTH SUPPORT
Filed Oct. 25, 1951
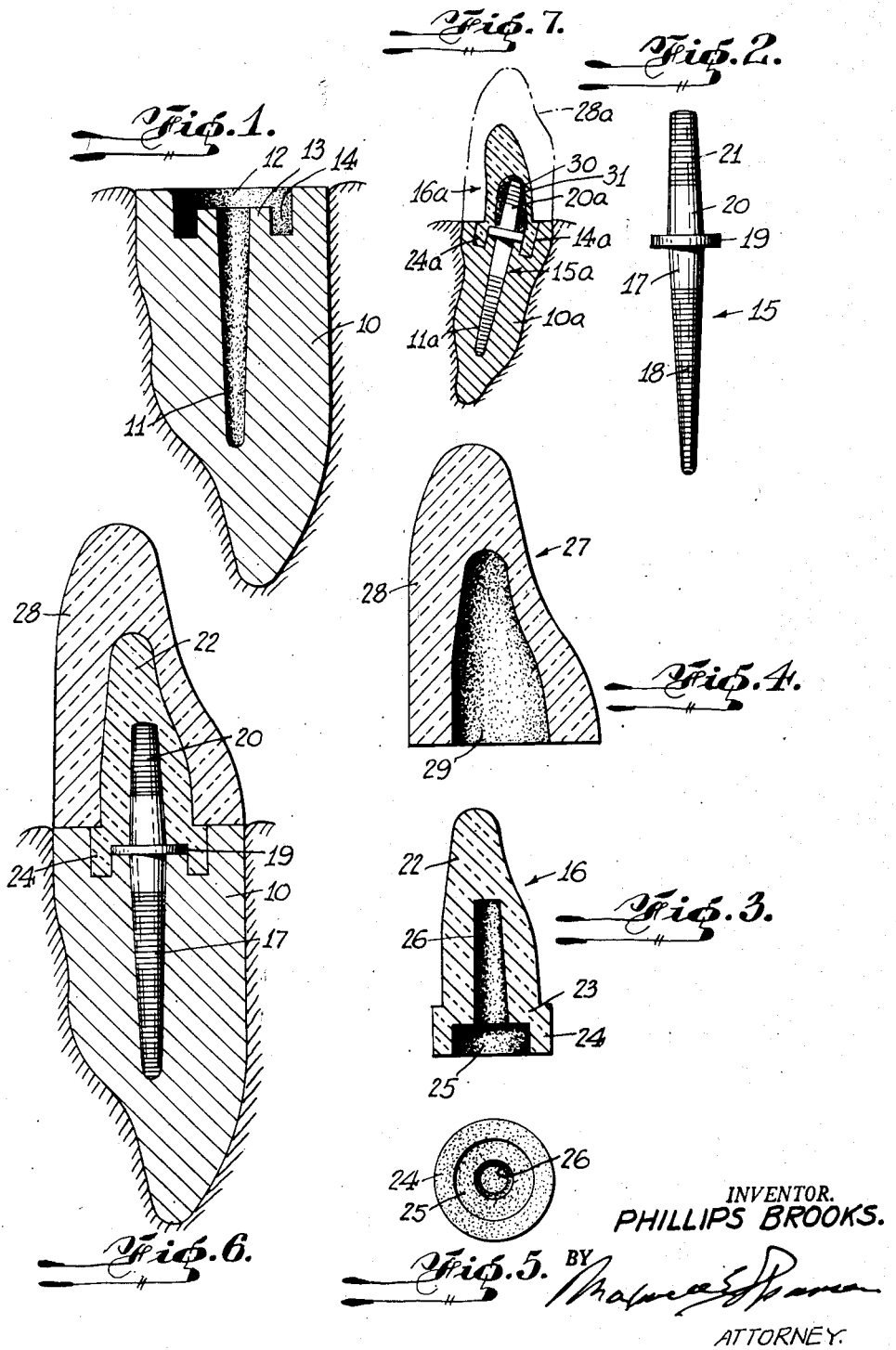
INVENTOR.
PHILLIPS BROOKS.
ATTORNEY.

Patented Oct. 20, 1953

2,655,724

UNITED STATES PATENT OFFICE 2,655,724

CROWN TOOTH SUPPORT

Phillips Brooks, Brooklyn, N. Y.

Application October 25, 1951, Serial No. 253,083

5 Claims. (Cl. 32—13)

The present invention relates to a support for a crown tooth, and is particularly related to an improved support for a plastic crown tooth.

An object of the present invention is to provide a support for a plastic crown tooth which effects a firm bond with the latter so that the crown tooth may not be loosened or removed.

Another object of the present invention is to provide a support for a plastic crown tooth including a plastic crown stump over which the crown tooth is mounted so that the stump will be of the same color and transparency as the crown tooth, and will not detract from the prosthetic appearance of the crown tooth.

Still another object is to provide a support for a crown tooth which includes a plastic stump and a metal anchoring dowel entering into both the stump and the suitably reamed-out canal of the tooth root to permit adjustment of the position of the stump relative to the dowel and tooth root so that the crown tooth mounted on the stump may be aligned with other teeth to provide a correct "bite."

A further object is to provide an inseparable molecular bond or union between the crown and the stump.

A further object is to provide a support for a crown tooth which includes a plastic stump and a metal anchoring dowel extending into the stump and the reamed-out canal of the tooth root, and wherein the stump is formed with an enlarged base having a depending peripheral flange or sleeve adapted to extend into an annular trough formed in the face of the tooth root concentric with the reamed-out canal so that the stump may be cementitiously secured to the dowel and to the tooth root directly with the bond to the latter supplementing the attachment to the dowel and preventing removal of the stump from the dowel.

The foregoing, and other objects, features and advantages of the present invention will appear in the following detailed description of an illustrative embodiment of the same to be read in connection with the accompanying drawing, forming a part of this specification and wherein:

Fig. 1 is a vertical sectional view of a tooth root prepared to receive a crown tooth support embodying the present invention;

Fig. 2 is an elevational view of a metal dowel forming a part of a crown tooth support embodying the present invention;

Fig. 3 is a vertical sectional view of a plastic stump forming another part of the crown tooth support constructed in accordance with the present invention;

Fig. 4 is a vertical sectional view of a plastic crown tooth adapted to be mounted upon the stump of Fig. 3;

Fig. 5 is a plan view of the lower end of the stump of Fig. 3; and

Fig. 6 is a vertical sectional view of the parts of the crown tooth support shown assembled together and secured to the tooth root with the crown tooth mounted on the stump portion of the support, and Fig. 7 illustrates diagrammatically a relative positioning of the stump and tooth root which may be realized by employing a modified opening or cavity in the stump.

Referring to the drawing in detail, wherein the same parts are referred to by the same numerals throughout the several views thereof, a tooth root 10 is shown in section in Fig. 1. The root 10 has been prepared to receive a crown tooth support embodying the present invention and, when so prepared, the tooth root has the canal thereof reamed-out to provide an elongated socket 11 opening at the top face of the root and preferably conical with its largest diameter at the top. The top face of the tooth root is countersunk concentrically with the socket 11 to provide a circular recess 12, and an annular ridge or rim 13 extends around the open top end of the socket, within the countersunk recess, to define a circular trough 14 between the rim 13 and the circular side wall of the countersunk recess 12.

The tooth root is preferably prepared as above to receive the crown tooth support of the present invention by employing the reaming tool set forth in my United States Letters Patent No. 2,453,696, issued November 16, 1948, so that the socket 11, countersunk recess 12 and annular trough 14 are formed in a single operation.

In accordance with the present invention, a support is provided for mounting a plastic crown tooth upon the tooth root prepared as shown in Fig. 1. Such a support embodying this invention includes an anchoring dowel and a stump, generally identified by the reference numerals 15 and 16, respectively. The anchoring dowel 15 (Fig. 2) includes an elongated shank 17, shaped to extend into the socket 11 of the prepared tooth root 10 and formed with circumferential scorings, as at 18, to improve the bond between the dowel and the tooth root when the shank 17 of the former is cemented in the socket 11 in the manner hereinafter described.

A circular flange or head 19, preferably of substantially the same diameter as the outer diameter of the rim 13 of the prepared tooth root, is formed on the anchoring dowel 15 at the inner end of the shank 17, and a stem 20, which is shorter than the shank 17, extends from the head 19 in axial alignment with the shank 17 but in the opposite direction. The stem 20 is also circumferentially scored, as at 21, to provide a secure connection to the stump 16 when the latter is anchored to the dowel in the manner hereinafter described. The anchoring dowel is formed of metal, either a base metal resisting corrosion or gold, in order to provide the attachment to the tooth root with the necessary strength.

The stump 16 (Fig. 3) includes a body 22 of non-symmetrical configuration and of a shape substantially similar to the outer configuration of the tooth crown to be fitted thereon so that the latter will be of approximately the same thickness at all of its parts. At the lower end of the body 22, an enlarged, circular base 23 is formed, and an annular flange 24 depends from the periphery of the base 23 to define a central, circular recess 25. The body 22 is further formed with a bore 26 to receive the stem 20 of the anchoring dowel and concentric with the circular recess 25 and opening downwardly into the latter. The flange 24 is formed to fit into the annular trough 14 of the prepared tooth root and has a depth which disposes the top surface of the stump base 23 flush with the top surface of the tooth root when the bottom edge of the flange engages the bottom of the trough 14. The recess 25 of the stump has a depth sufficient to receive the rim 13 of the prepared tooth root and the flange 19 of the anchoring dowel.

The stump 16 is formed of a plastic material, preferably translucent or transparent, such as, for example, methyl methacrylate resin.

In employing the crown tooth support described above, after the preparation of the tooth root for its reception, the shank portion 17 of the anchoring dowel is cemented into the socket 11 of the prepared tooth root (Fig. 6), a conventional dental cement, such as, for example, oxyphosphate of zinc, being used for that purpose, with the flange 19 of the dowel seating on top of the rim 13 of the tooth root. The stump 16 is then cemented on the stem 20 of the dowel and to the tooth root, again employing a conventional dental cement such as that specified above. It will be noted that the stump 16 is held to the dowel along the surface of the stem portion 20 and the top surface of the flange 19 of the latter, and further that the flange 24 of the stump is cementitiously held to the tooth root along its inner and outer faces and lower edge. Thus, the stump is securely held to the anchoring dowel.

After the stump has been affixed to the dowel and tooth root in the manner detailed above, a crown tooth, generally identified by the numeral 27 (Fig. 4), is mounted upon the stump 16 (Fig. 6). The crown tooth 27 consists of a body 28 formed of a plastic material, such as, for example, methyl methacrylate, which is suitably colored to match the coloration of the other teeth. The body 28 is formed with a downwardly opening recess 29 shaped to receive the non-symmetrical stump 16. The crown tooth 27 is cementitiously secured to the stump 16 by a quick-setting plastic material which does not require the application of either heat or pressure to secure a firm and permanent bond between the two parts. For this purpose, it is desirable to use any of the acrylic filling materials primarily intended for employment as dental fillings. Such acrylic filling materials, when introduced between the confronting surfaces of the acrylic stump and crown tooth cause these surfaces to flow together to produce an inseparable molecular bond therebetween. Thus, removal of the crown tooth from the stump is prevented and the overcoming of the heretofore loosening up of the crown due to expansion thereof in the mouth by the absorption of moisture, which has heretofore constituted a considerable problem. Although the plastic crown has great integral strength, it can easily be ground where necessary to effect the desired alignment, whereas a metal stump which hs heretofore been used is much more resistant to grinding.

Having thus described a preferred embodiment of my invention, it will be apparent that the acrylic stump, being preferably of the same material as the crown tooth, will not detract from the prosthetic appearance of the latter by producing a dark shadow within the crown, as when a metal stump is employed. Further, while employing a plastic stump to take the fullest advantage of the ability of a plastic crown tooth to simulate the appearance of the natural teeth, the use of a two-part support, in which the thin dowel extending into the tooth root is formed of metal, provides a secure and strong attachment to the root, with the cooperating flange 24 and trough 14 of the stump and prepared tooth root enhancing this attachment to make a two-part support practicable. Finally, the use of a two-part support permits adjustment of the position of the stump relative to the dowel before the cement holding these parts together has set, so that the relationship of the crown tooth to other teeth in the mouth may be varied at the time of assembly to assure a correct "bite." In order to provide for such adjustment, the trough 14 and or recess 25 and the bore 26 are preferably formed to permit some play therein of the flange 24 and stem 20, respectively.

Fig. 7 illustrates the desirability of utilizing a two-part support, where the root 10a is disposed at angle with respect to the upper surface of the lower jaw of the mouth. Socket 11a and trough 14a will have to be drilled at a similar angle, anchoring dowel 15a being located in socket 11a. Thus, stem 20a will also be disposed at such angle within stump 16a. To facilitate the application of stump 16a to stem 20a with its flange 24a in trough 14a, a larger opening 31 in stump 16a is required to permit straightening of the stump 16a. The unoccupied space in opening 31 is filled with the cement 30, thereby binding the stump 16a to dowel support 15a.

Thus, by making the stump separate from the dowel support, an opportunity is afforded to shift the stump in whatever direction it may be desired by enlarging the circularly sectioned trough it is purchased in.

Having thus described an illustrative embodiment of my invention, it is to be understood that the invention is not limited to the precise details thereof, and that changes and modifications, obvious to one skilled in the dental art, may be made therein without departing from the spirit or scope of the invention as defined in the appended claims.

What I claim is:

1. A crown tooth assembly for mounting on a prepared tooth root having a socket opening upwardly into a circular recess formed with an annular trough in the bottom thereof; said assembly comprising a plastic stump formed with a non-symmetrical outer configuration and having an enlarged circular base formed with a depending peripheral flange for engagement in the annular trough of the tooth root and defining a central recess, said stump having a vertical bore opening downwardly into said central recess, an anchoring dowel including axially aligned and oppositely extending stem and shank portions separated by a radial flange and adapted to extend into said bore of the stump and the tooth root socket, respectively, and a plastic crown tooth having a hollowed out central portion opening downwardly to receive said stump.

2. A crown tooth assembly as set forth in claim 1; wherein said crown tooth and stump are both formed of an acrylic resin.

3. A crown tooth assembly as set forth in claim 2; wherein said crown tooth and stump are both formed of methyl methacrylate.

4. A crown tooth support for mounting on a prepared tooth root having an upwardly opening socket and an annular trough formed in the top face of the prepared tooth root around the socket; said crown tooth support comprising a plastic stump having a vertical bore opening downwardly and an enlarged circular base formed with a depending peripheral flange for engagement in the annular trough of the prepared tooth root, said depending peripheral flange defining a central recess opening downwardly at the bottom of said stump, and a metal anchoring dowel having a circular flange extending therefrom intermediate its length for reception in said recess, said anchoring dowel extending at one end into said bore of the stump and formed at its other end to fit into the upwardly opening socket of the prepared tooth root.

5. A crown tooth support for mounting on a prepared tooth root having a socket opening upwardly and an annular trough in the top face of the prepared tooth root around the socket; said crown tooth support comprising a plastic stump having a vertical bore opening downwardly and formed with a depending peripheral flange at the lower end thereof for engagement in the annular trough of the prepared tooth root, said depending peripheral flange defining a central recess opening downwardly at the bottom of said stump and communicating with said bore of the latter, and a metal anchoring dowel having a flange extending therefrom intermediate its length for reception in said recess, said anchoring dowel extending at one end into said bore of the stump and formed at its other end to fit into the upwardly opening socket of the prepared tooth root.

PHILLIPS BROOKS.

References Cited in the file of this patent

UNITED STATES PATENTS

| Number | Name | Date |
| --- | --- | --- |
| 635,773 | Hamilton | Oct. 31, 1899 |
| 1,279,805 | Whitaker | Sept. 24, 1918 |
| 2,327,548 | Pearlman | Aug. 24, 1943 |